United States Patent [19]

Garmon et al.

[11] Patent Number: 5,355,450
[45] Date of Patent: Oct. 11, 1994

[54] MEDIA COMPOSER WITH ADJUSTABLE SOURCE MATERIAL COMPRESSION

[75] Inventors: Paul D. Garmon, Winchester; Robert A. Gonsalves, Brighton; Patrick D. O'Connor, Framingham, all of Mass.; Stephen J. Reber, Nashua, N.H.; Eric C. Peters, Carlisle; Joseph H. Rice, Arlington, both of Mass.; Curt A. Rawley, Windham, N.H.

[73] Assignee: Avid Technology, Inc., Tewskbury, Mass.

[21] Appl. No.: 866,829

[22] Filed: Apr. 10, 1992

[51] Int. Cl.$^5$ ............................................. G06F 15/62
[52] U.S. Cl. ................................... 395/162; 348/578; 348/579; 348/384; 348/722
[58] Field of Search ...................... 395/162, 154, 114; 358/22, 181, 182, 183, 185, 133-136

[56] References Cited

U.S. PATENT DOCUMENTS

| | | | |
|---|---|---|---|
| 4,302,775 | 11/1981 | Widergren et al. | 358/136 |
| 4,672,441 | 6/1987 | Hoelzlwimmer et al. | 358/135 |
| 4,734,767 | 3/1988 | Kaneko et al. | 358/133 |
| 4,797,742 | 1/1989 | Sugiyama et al. | 358/141 |
| 4,814,871 | 3/1989 | Keesen et al. | 358/133 |
| 4,890,161 | 12/1989 | Kondo | 358/135 |
| 4,951,139 | 8/1990 | Hamilton et al. | 358/135 |
| 4,982,282 | 1/1991 | Saito et al. | 358/133 |
| 5,021,891 | 6/1991 | Lee | 358/432 |
| 5,038,209 | 8/1991 | Hang | 358/136 |
| 5,073,821 | 12/1991 | Juri | 358/135 |
| 5,107,345 | 4/1992 | Lee | 358/136 |
| 5,138,459 | 8/1992 | Roberts et al. | 358/209 |
| 5,170,264 | 12/1992 | Saito et al. | 358/433 |

FOREIGN PATENT DOCUMENTS

| | | |
|---|---|---|
| 0207774 | of 1986 | European Pat. Off. |
| 0296608 | of 1988 | European Pat. Off. |
| 0310175 | of 1989 | European Pat. Off. |
| 3940554A1 | 6/1990 | Fed. Rep. of Germany |
| WO91/14339 | 9/1991 | World Int. Prop. O. |

OTHER PUBLICATIONS

Mac Week vol. 4 No. 39 p. 5, Nov. 13, 1990.
Wallace, G. K., "The JPEG Still Picture Compression Standard," Communications of the Association for Computing Machinery, vol. 34, No. 4, pp. 30-34, April 1991.
Keesen et al., "Coding of Color Television Signals Using a Modified M-Transform for 34 MBit/s-Transmission", Frequenz, vol. 38, No. 10, Oct. 1984, with translation, pp. 238-243.
Tasto et al., "Image Coding by Adaptive Block Quantization," IEEE Transaactions on Commmunication Technology, vol. COM-19, No. 6, December 1971, pp. 957-972.
Lohscheller, H., Proceedings of the 1983 International Zurich Seminar on Digital Communications, March 1984, pp. 25-31.
Goetze, M., "Combined Source Channel Coding in Adaptive Transform Coding Systems for Images," Proceedings of the IEEE International Conference on Communications, May 1984, vol. 1, pp. 511-515.
Chantelou et al., "Adaptive Transform Coding of HDTV Pictures," Signal Processing of HDTV, Proceedings of the Second International Workshop on Signal Processing of HDTV, L'Aquila, Feb. 29th 1988-Mar. 2nd 1988, pp. 231-238.
S. M. C. Borgers et al., "An Experimental Digital VCR With 40 mm Drum, Single Actuator and DCT-Based Bit-Rate Reduction," IEEE Trans. on Consumer Electronics, vol. 34, No. 3, 1988.

Primary Examiner—Robert L. Richardson
Attorney, Agent, or Firm—Wolf, Greenfield & Sacks

[57] ABSTRACT

Media composer for editing source material. The media composer includes apparatus for receiving digitizing, storing and editing video and audio source material. Computing apparatus manipulates the stored source material and output apparatus communicates with the computing apparatus to display the manipulated material and control information. The computing apparatus includes JPEG compression techniques and is programmed to provide enhanced editing features.

20 Claims, 7 Drawing Sheets

MEDIA COMPOSER WITH ADJUSTABLE SOURCE MATERIAL COMPRESSION

BACKGROUND OF THE INVENTION

Video and audio source material editing systems employing digital techniques have been introduced over the last several years. One example is the Avid/1 Media Composer from Avid Technology, Inc., of Burlington, Mass. This media composer receives, digitizes, stores and edits video and audio source material. After the source material is digitized and stored, a computer such as an Apple Macintosh based computer manipulates the stored digital material and a pair of CRT monitors are used for displaying manipulated material and control information to allow editing to be performed. Later versions of the media composer included compression techniques to permit the display of full motion video from the digitized source material. Compression was achieved using a JPEG chip from C-Cube of Milpitas, Calif. That data compression is described more fully in copending application U.S. Ser. No. 07/807,269 filed Dec. 13, 1991, and entitled Buffer and Frame Indexing. The teachings of this application are incorporated herein by reference. Although previous media composers could achieve full motion video from digitized sources, the compression degraded image quality below desirable levels. Further, the media composer lacked features which enhance the editing process.

SUMMARY OF THE INVENTION

The media composer according to the invention for editing source material includes apparatus for receiving, digitizing, storing and editing video and audio source material. Computing apparatus manipulates the stored source material and output apparatus communicates with the computing apparatus for displaying the manipulated material and control information. The computing apparatus includes JPEG compression apparatus and is programmed so that multiple JPEG resolutions can be displayed, recorded and played back.

In another aspect of the invention, the computing apparatus is programmed to provide motion effects in the displayed material and is further programmed to provide a dial whose rotation rate corresponds to a selected motion effect rate. Motion effects include forward and reverse variable speed effects, fit-to-fill capability, and strobe motion. The improved media composer of the invention enables a variety of wipes to be effected, zoom to full screen capability, pitch change audio scrub, graphics positioning and image capture instrumentation. The system also enables sync point editing and slip sync. The system also provides for a novel mechanical user interface including a track ball and speed control integrated into a single unit. Importantly, the system also supports a media consolidation process to free up disk space.

DESCRIPTION OF THE PREFERRED EMBODIMENT

Figure 1:
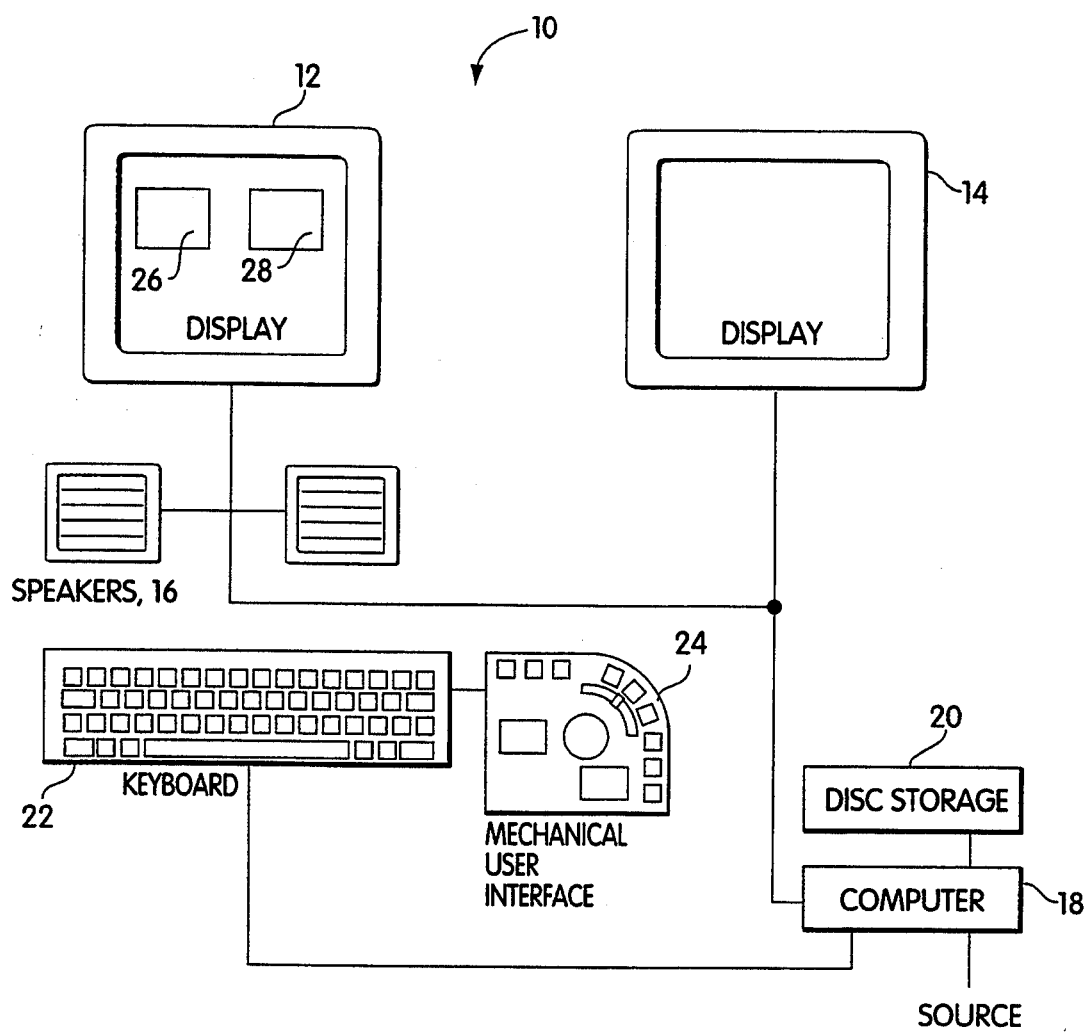
FIG. 1 is a schematic diagram of the media composer system.

With reference to FIG. 1 the media composer system 10 includes a pair of CRT displays 12 and 14 and an audio output device 16 which may include two speakers. The video displays 12 and 14 and the audio transducer 16 are controlled by a computer 18. It is preferred that the computer 18 be a Macintosh from Apple Computer Corporation designated as $II_x$, $II_{ci}$, $II_{fx}$ or Quadra 900. Disk storage apparatus 20 communicates with the computer 18. Disk storage 20 includes one to seven disks for media storage. The disks may be optical or magnetic. The system 10 is controlled by a keyboard 22 and a mechanical user interface 24 to be described in more detail herein.

In operation, video and audio source material is received by the system 10, digitized and stored in the disk storage device 20. The computer 18 is programmed so that the digitized source material may be edited and displayed on one of the video display devices such as the CRT display 12. Typically digitized source material would be displayed at a location 26 and edited material at a location 28 on the display 12.

Figure 2A:
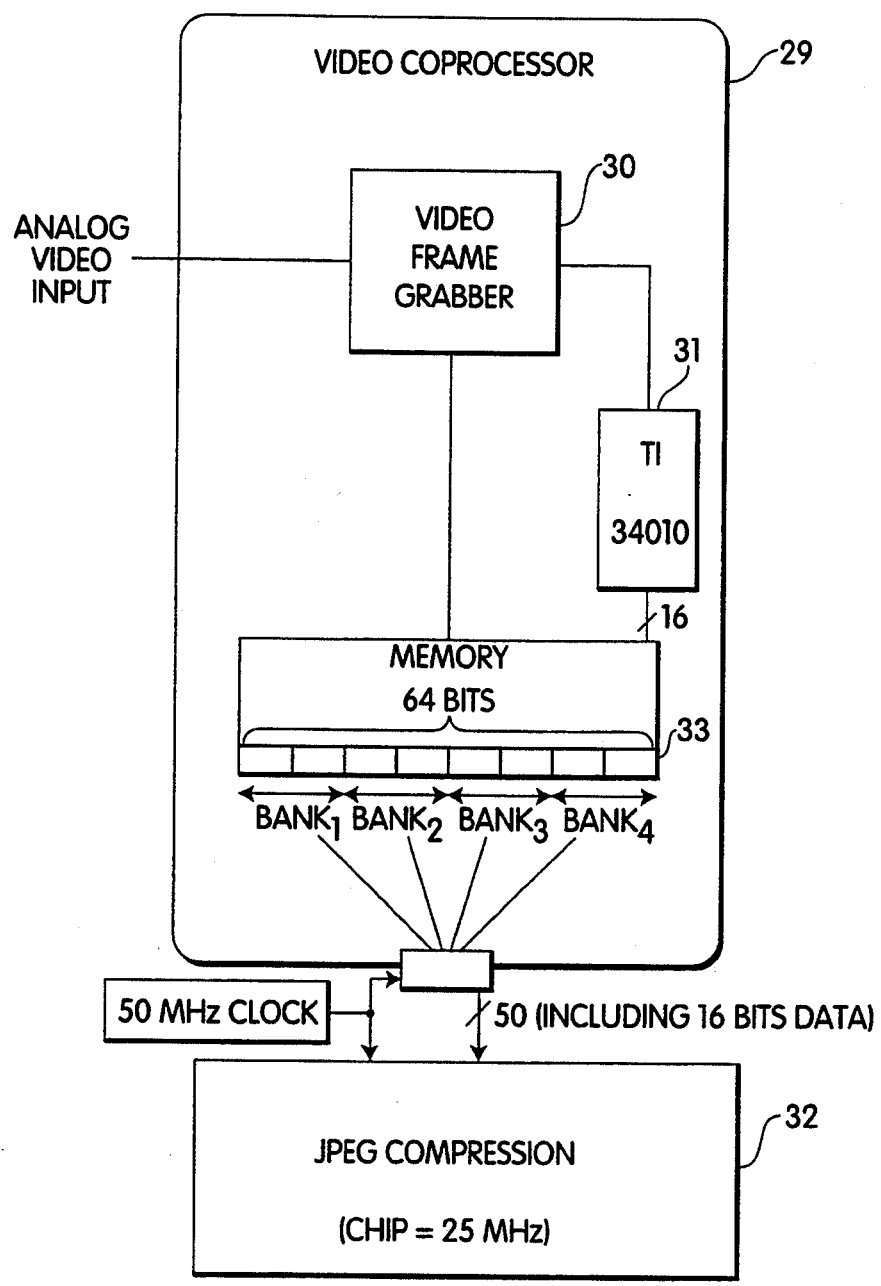
FIG. 2a is a prior art video compression configuration.

As will be appreciated by those skilled in the art, reproducing full motion, 30 frames per second color video from a digital source is a daunting task. FIG. 2a illustrates a prior art system for providing digitization and compression of video images. This system includes a video coprocessor 29, such as the NuVista board made by TrueVision of Indianapolis, Ind. Many other commercially available boards may also be used. A suitable video coprocessor includes a video frame grabber 30 which converts analog video information into digital information, representing each pixel of a frame with a predetermined number of bits, in this case 16-bits. The video coprocessor 29 has a memory 33 which is configured using a coprocessor 31, such as the TI34010 made by Texas Instruments, to provide an output data path to feed JPEG circuitry, such as is available as chip CL550B from C-Cube of Milpitas, Calif. Such configuration can be performed using techniques known in the art. In the system of FIG. 2a, the output data path is 64 bits, divided into four banks of 16 bits. Two significant limitations exist in this situation. First the connection path between a video coprocessor 30 and JPEG compression circuitry 32 was a 50-wire design allowing only 16 bits to pass at one time (16 wires for data; 16 for control of data; others for synchronizing and system control). Second, the JPEG circuitry 32 (and the 16-bit connection) was driven by a 50 MHz clock which governed its speed to match adequately the 16-bit per cycle flow. The combination of these limitations resulted in an inability to process 640×480×24 (or 32) bit images at 60 fields per second. Typically users of the JPEG chip ($c^3$ CL550B chip) dealt with this by either shrinking the size of the image, reducing the bits per pixel information, or slowing the fields per second rate. All of this results in lower quality video.

Figure 2B:
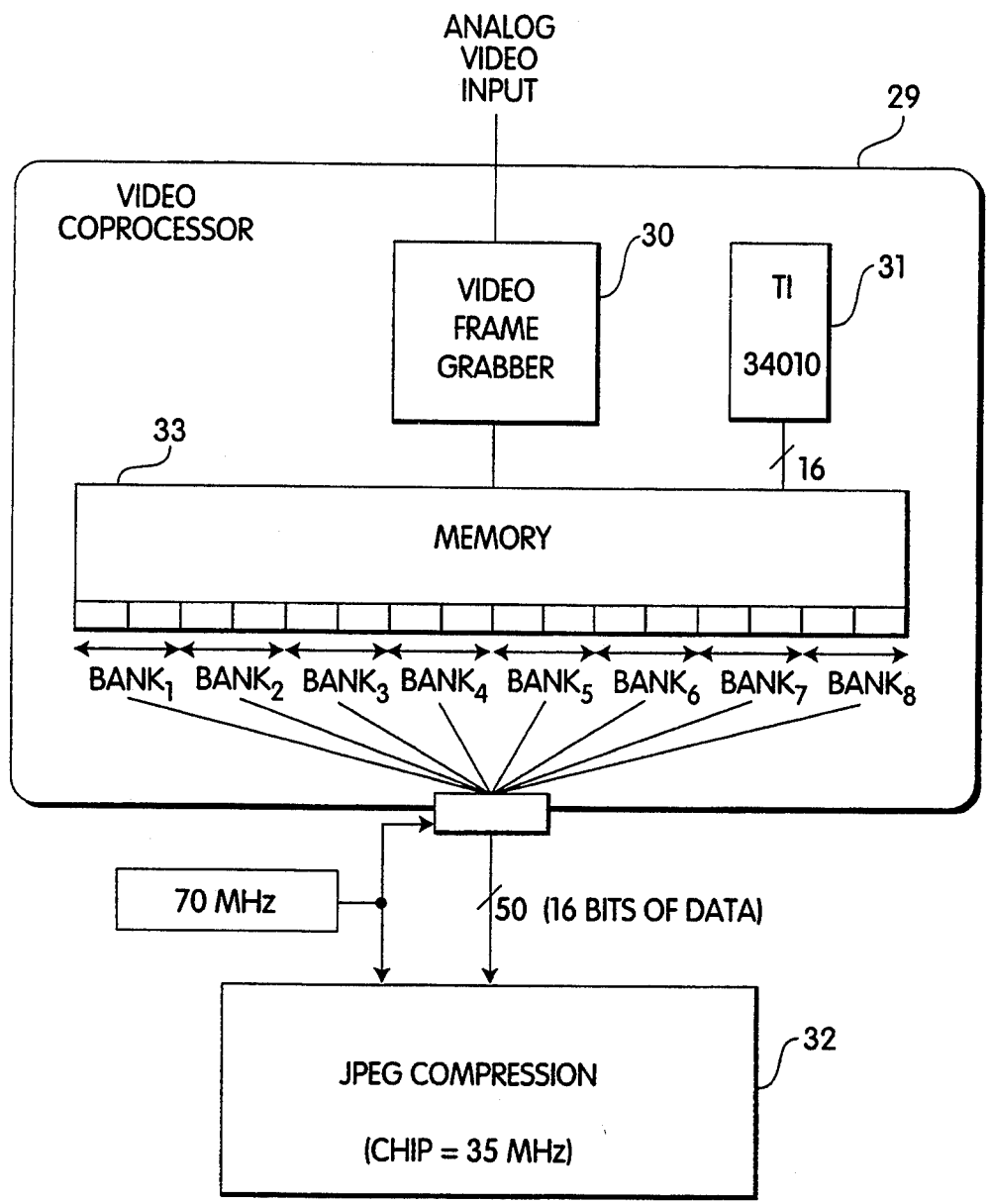
FIG. 2b is the video compression configuration according to the present invention.

FIG. 2b illustrates an improvement over the prior art. Similar components are used for the video coprocessor 29 and JPEG compression circuitry 32. The memory 33 of the video coprocessor 29, however, is configured to provide a 128-bit data path, wherein each pixel is represented by 24-bits. The connection between the coprocessor 29 and the JPEG compression circuitry is run at 70 MHz. The JPEG circuitry is programmed using known techniques to indicate that 24-bits of input data is used to represent a pixel. The net effect of these improvements is that the JPEG chip is run faster and receives more data, allowing compression of 60 frames per second of 640×480×24 (32) images.

The use of a 24-bit word for each pixel may increase compressed frame size depending on the content of a particular frame. A JPEG chip is configured for compression by providing two 8×8 quantization tables, which are well known in the art. The values are placed into these tables according to frequency. A "Q factor," a composite number which multiplies values in the tables, may be used to designate and scale values in this table. A high Q factor provides increased compression typically at the expense of resolution. A low Q factor improves resolution but typically increases compressed frame size. With most systems, if the Q factor is too low, and the compressed frame size is too high, the JPEG compression chip cannot compress incoming data at an adequate speed. Typically, when this happens, the user is notified, compression stops and a higher Q factor must be selected.

In an embodiment of the present invention, the compressed frame size is monitored in a manner to be described below. When it is determined that the compressed frame size is too large, the Q factor may be increased, or the tables adjusted, automatically. Conversely, if the compressed frame size is small, the Q factor may be decreased, or the tables changed, to increase resolution. The decrease or increase of the Q factor may be performed in a binary, step-wise or other suitable manner. Changing the Q factor changes all values in the table, and requires, at playback time, that the same table be used. As an alternative to changing the Q factor, the values in the table can be decreased for the highest frequencies first, and eventually for lower frequencies, depending on the desired increase or decrease in compression. For this purpose, a table may be maintained to relate a percentage of disparity between actual and desired compression to a number of values in the table to be decreased. If, for example, an actual compression of 22 K bytes/frame is achieved when 20 K bytes/frame was desired, a disparity of 10% is obtained. From this table, the number of frequencies to be decreased can be determined. The change can be made in a manner known to those of skill in this art. This dynamic adjustment, or roll-off, is not limited to use with systems representing pixels with 24-bit words. It may be used with other systems, such as the system of FIG. 2a.

The monitoring of the compression frame size will now be described. For this purpose, the coprocessor 31 is programmed, using well-known techniques, so that, at the end of each frame received, eight black lines are provided to the JPEG compression circuit. It then issues an interrupt signal, which is received by the host computer. By the time the host computer receives the interrupt signal, all data from the compressed frame is compressed and the only data remaining in the pipeline in the JPEG circuit are the extra black lines. Since part of the JPEG standard includes placing a marker at the beginning of the frame, the length of the compressed frame may be readily determined. Although the extra black lines become part of the compressed image, they are readily removed upon decompression and playback, by removing the last eight lines of each decompressed frame.

Table 1 illustrates the various hardware configurations for achieving different levels of resolution. In the table, JPEG III refers to the configuration shown in FIG. 2b.

Figure 3:
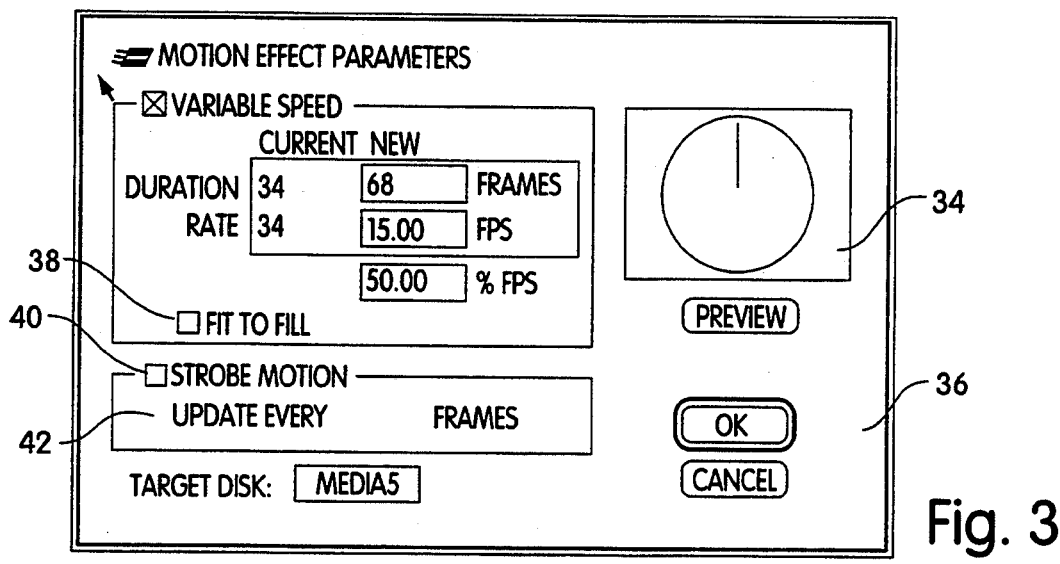
FIG. 3 is a schematic view of the motion effects screen.

The improved media composer of the invention allows the user to pre-visualize motion effects by creating clips and media files which display the requested effect. The new clip can be used like any other chip—it can be trimmed, extracted, overwritten, used in dissolves and wipes, etc.—and its media can be manipulated as any other, that is, it can be deleted, consolidated, and even back digitized. The new motion effect clips are video only. The start time code is zero hour regardless of the time code of the original clip. Motion effects can be created from master clips and subclips, but not from other motion effect clips. There is a delay as the media composer creates new media files. Motion effects are organized into three related features: variable speed, fit-to-fill, and strobe motion. These features are accessed through a single command in a source menu. A Motion Effects command opens a dialog box illustrated in FIG. 3. A preview dial 34 allows the operator to pre-visualize the effect even before the OK function 36 is clicked on. The dial 34 normally rotates at one revolution per second. When the operator enters values for an effect and clicks on PREVIEW, the dial rotates at the new appropriate speed. In this way, the preview dial works as a metronome to give the operator a feel for the pace or rhythm of the effect.

TABLE 1

Hardware Matrix (PRELIMINARY)

| Res. | Depth | Audio | Max K/f | | CPU | JPEG | Audio HW | Disks | Atto | Comments |
|------|-------|-------|---------|---|-----|------|----------|-------|------|----------|
|      |       |       |         |   | IIx | JPEG I | AudioMedia | Panasonic Opticals | Without | |
|      |       |       |         |   | IIci | JPEG II | SA-4 & VSD or Pro I/O | 600 MB | With | |
|      |       |       |         |   | IIfx Quadra 900 | JPEG III | | 1 GB 1.5 GB 5400 RPM | | |
| VR1  | 24 bit | 2 × 22 kHz | 7 | 320 × 240 | IIx | JPEG I | AudioMedia | Panasonic Opticals | Without | |
| VR2  | 24 bit | 2 × 44 kHz | 12 | 320 × 240 | IIx | JPEG I | AudioMedia | 600 MB | Without | |
| VR3  | 24 bit | 2 × 48 kHz (one disk) 4 × 48 kHz (sep. disks) | 18 | 640 × 240 | IIx | JPEG I | SA-4 & VSD or Pro I/O | 600 MB | Without | |
| VR4  | 24 bit | 2 × 48 kHz | 23 | 640 × 240 | IIfx | JPEG II | SA-4 & VSD | 1 GB | With | |

TABLE 1-continued

Hardware Matrix (PRELIMINARY)

| Res. | Depth | Audio | Max K/f | | CPU | JPEG | Audio HW | Disks | Atto | Comments |
|---|---|---|---|---|---|---|---|---|---|---|
| | | (one disk) 4 × 48 kHz (sep. disks) | | | | | or Pro I/O | (600 MB?) | | |
| VR5 | 24 bit | 4 × 48 kHz | 40 | 640 × 240 | IIfx | JPEG II | SA-4 & VSD or Pro I/O | 5400 RPM | With | |
| R21 | 16 bit | 4 × 48 kHz | 20 × 2 | 640 × 240 × 2 | Quadra 900 | JPEGII | SA-4 & VSD or Pro I/O | 5400 RPM | With | Maybe not 4.0 |
| | 24 bit | | | | | JPEG III | | | | |
| Not for release in 4.0 | | | | | | | | | | |
| VR6 | | 4 × 48 kHz | 60 | 640 × 240 | Quadra 900 (IIfx?) | JPEG III | SA-4 & VSD or Pro I/O | 5400 RPM | With | Not for 4.0 |
| VR22 | | 4 × 48 kHz | 30 × 2 | 640 × 240 × 2 | Quadra 900 | JPEG III | SA & VSD or Pro I/O | 5400 RPM | With | Not for 4.0 |

Forward and reverse variable speed effects will now be discussed. First of all, the operator opens a clip in the source monitor 12 and marks an IN and an OUT, and chooses motion effects from the monitor 14 command menu. The operator then enters any one of three parameters: duration, play rate (in fps), or percent speed. When any one of these parameters is entered, the media composer immediately calculates and displays the values for the other two parameters. For example, if one marks a one second piece and enter 50% fps, the media composer will immediately show two seconds as the duration and 15 fps as the play rate of the new clip. One specifies reverse motion by entering an negative rate or percent speed. When the operator clicks on OK, the media composer creates a new clip and video/media file for the appropriate effect and loads this clip into the source monitor 12. It should be noted that when the operator asks for slow motion, the media composer creates a clip in which each frame is duplicated a proportionate number of times. Similarly, when one asks the media composer for fast motion, it creates a clip in which some portion of the source frames have been deleted. When these clips are played, the motion may appear jerky since the media composer is not synthesizing a smoothed series of frames. This effect is especially likely with material transferred from film.

The fit-to-fill option allows one to have the media composer calculate the motion effect required to fill a specific duration in a sequence with a specific duration from the source. The fit-to-fill check box 38 is bold only when the operator has marked an IN and OUT in both monitors 26 and 28 or the four marks are implied by the location of the position control. Given these values for the source (current) and target (new) durations, the media composer calculates the necessary rate in percent speed of the motion effect. One may accept these or enter one's own values. Once the media composer has created a new clip, one can overwrite or splice it into the sequence.

Strobe motion is a type of motion effect in which one frame is held for a specific duration and then the next for the same duration and so on. When one opens a clip in the source monitor, mark an IN and an OUT, and select strobe motion 40 in the motion effects dialog box. The operator must fill in the n in "update every n frames" 42. The new clip will have the same duration as the current one but only even nth frame is displayed. A Remake Effects command recreates dissolve media files and includes all motion effects. As with transition effects it is only possible to recreate motion effect media files when the original source media is online. When the operator batch digitizes a sequence which includes motion effects, the effects are automatically recreated at the end of the process. Motion effects are represented correctly in all supported edit decision list (EDL) formats with the following caveat: It may not be possible to express accurately the media composer motion effect in an EDL because the format may limit the precision with which percent speed can be expressed to whole numbers or one decimal place and the media composer is not likewise limited. In this case, the media composer appropriately truncates the rate or percent speed in the EDL and generates a comment which indicates the true rate or percent speed. With the exception of freeze flames, motion effects are ignored by auto-assembly. Auto-assembly edits video from an original clip at 30 frames per second, starting at the edit inpoint and filling the duration of the effect.

The improved media composer will allow the operator to play four tracks of audio simultaneously instead of only two as in earlier versions. The four tracks are not output through four separate channels, rather only two. The operator hears the tracks through two speakers 16 (FIG. 1) according to the pan setting for each track. In addition, it is not possible to digitize simultaneously four channels of audio. The operator can specify which tracks are candidates to be played by tagging them with speakers on an edit panel. When the operator chooses 1) to play a sequence, 2) to record a digital cut, or 3) to auto assemble a sequence with direct audio, the audio tracks will be output through two channels according to the pan setting for every component on each track. The two output channels can be either analog or digital according to the wiring of an audio interface unit. If the user selects audio from tapes, auto-assembly will execute edits for audio channels 3 and/or 4. If the selected EDL format supports four channels, the EDL will include edits for channels 3 and/or 4. The EDL formats which support 4 channels are CMX 3600, Sony 9000 and GVG 4.1. In both the EDL tool and auto-assembly, the user can specify which media composer tracks are output as channels 1, 2, 3 and 4. One should note that it is not possible to digitize or output four analog channels of audio simultaneously. However, regardless of the software limitations, it is not possible to output four digital channels of audio because of limitations in the audio interface.

The media composer of the invention will allow the operator to digitize audio at a 48 KHz sample rate. However, it is not possible to use both 48 and 22 KHz or 44 KHz audio in the same sequence. Thus, 48 KHz must be used exclusively when playing a sequence or batch digitizing. When working with the audio interface and video slave driver and 48 KHz audio is selected in the digitized selections dialog box, the media composer automatically adjusts the sample rate on the audio interface. However, one must manually switch the video slave driver from 44 to 48 KHz. Digitizing mixed audio allows one to save space by combining the material in two audio channels into a single media file which is played from both speakers 16. All other audio features, including crossfades, mixdown, and both types of audio scrub, work with 48 KHz audio. The minimum audio hardware required to digitize 48 KHz is a SA-4 card and either the Pro I/O or Pro Tools. This hardware is available from Digidesign of Menlo Park, Calif. The media composer improves 22 KHz audio by automatically increasing the amplitude of low-level signals.

Figure 4A:
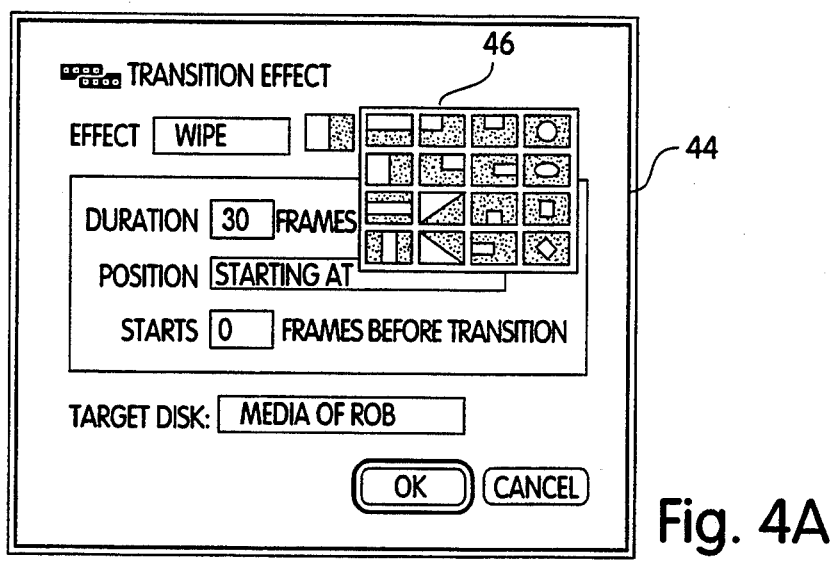
FIGS. 4a and 4b are schematic illustrations of the transition effects screen.
Figure 4B:
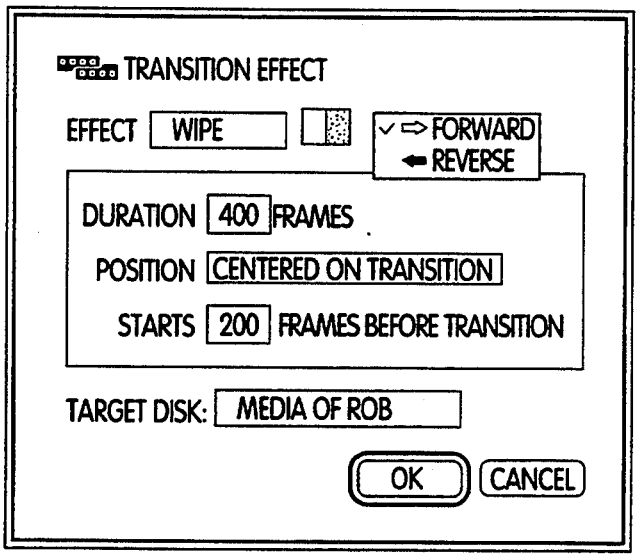

The media composer of the invention offers wipes as a transition effect. Wipes are accessed through a Transition Effect command. This command opens a dialog box 44 (FIG. 4a) which allows the user to choose in a pop-up menu between the two transition effects: dissolve and wipe. When wipe is selected, the operator can choose a pattern from a menu of sixteen choices 46 (displayed graphically) and a direction—forward or reverse as shown in FIG. 4b. Forward means that the outgoing clip is represented by the white in the pattern from the menu 46 and the incoming by the black (actually blue). Reverse means the incoming is represented by the white. Regardless of whether the operator chooses dissolve or wipe, the duration must be entered in frames, its start relative to the transition (starting, centered, ending, or offset) and a target drive for the media files.

The effect can be viewed only after the media composer creates a media file for the specified wipe or dissolve. These effect files will be created, deleted, and recreated in exactly the same way dissolve media files have been in earlier versions. The Remake Effects command includes all transition effects. As with motion effects, it is only possible to recreate transition effect media files when the original source media is online. For example, media for both the incoming and outgoing clip must be online for the media composer to recreate the dissolve between them. When a sequence which includes transition effects is digitized, the effects are automatically recreated at the end of the process. All wipes are expressed correctly in all EDL formats. A dialog box from the EDL Tool allows one to specify the appropriate pattern number for each wipe pattern. The table of numbers and patterns is stored in a file which can be moved from on media composer to another. It is not, however, possible to save and choose among several different sets of values. The present media composer will also allow the operator to zoom to full-screen mode from any monitor (source, record, pop-up) by pressing the quote key. All keyboard equivalents function in full-screen mode. The one exception is that one cannot use Trim Mode while in full-screen play.

The media composer of the present invention allows the operator to enter a mode in which a mouse controller can be used as a shuttle control. Hit L to shuttle forward, Play (the 5 and Back Quote Keys) to shuttle at 30 fps, K (or click a mouse button) to pause (zero speed), J to shuttle backward, and the Space Bar to exit the Shuttle Mode. Hit L twice to shuttle at 60 fps, thrice to shuttle at 90 fps. Hit J twice for −60 and thrice for −90. While shuttling at zero speed, either full-screen or normal, many of the keyboard functions are active. It is possible to step through the program, clear marks, use both kinds of audio scrub (see below), go to the next or previous edit, show safe titles, etc. If the media composer cannot do the function and remain in Shuttle Mode, the mode is dropped and the function performed. Toggling between source and record is an example of such an operation. In one embodiment of the present invention, jog shuttling may be performed, with a result which is similar to that obtained using mechanical jog shuttle controls in connection with video tape recorders. With digitized images being played, a mouse or similar input device can provide control for jog shuttling. Jog mode begins when an operator pressed a button. While the button is depressed, movement of the mouse in one direction or another determines the speed of shuttling, or of playback. That is, the position of the mouse when the button is depressed is used as a reference position. With a relationship defined between position and playing speed, the further the operator moves the mouse from the reference position, the faster video is played back in a given direction. For example, movement of the mouse to the right increases the forward playing speed. If the mouse is returned to the reference position, playing stops. As the mouse is moved to the left, the reverse playing speed increases.

An important aspect of the present media composer is a pitch change audio scrub feature. When the operator shuttles through footage, smooth, continuous audio will be produced at the corresponding speed. That is, pitch will vary with the speed as with an analog tape. This feature is available for one track only. Designate the track for smooth scrub by option clicking (or double clicking) on the speaker icon for that track. The icon becomes an outline. Smooth scrub is available whenever the operator is shuttling, using either the mouse or the shuttle control (beneath the Play button on a keyboard discussed below) to determine the shuttle speed.

When the operator imports a graphic into the media composer and edits it onto the G track of the sequence, it may not be positioned optimally with respect to the underlying video. When the position control is within the graphic element, you can drag the graphic to a more desirable position. Option-drag is for fine control and control-click will move the graphic to its original centered position. During dragging, the media composer displays a special window with information about the graphic's current position relative to the center (its original position) and relative to its position immediately before it was moved. Both of these positions are measured in pixels along the horizontal and vertical axes.

Figure 5A:
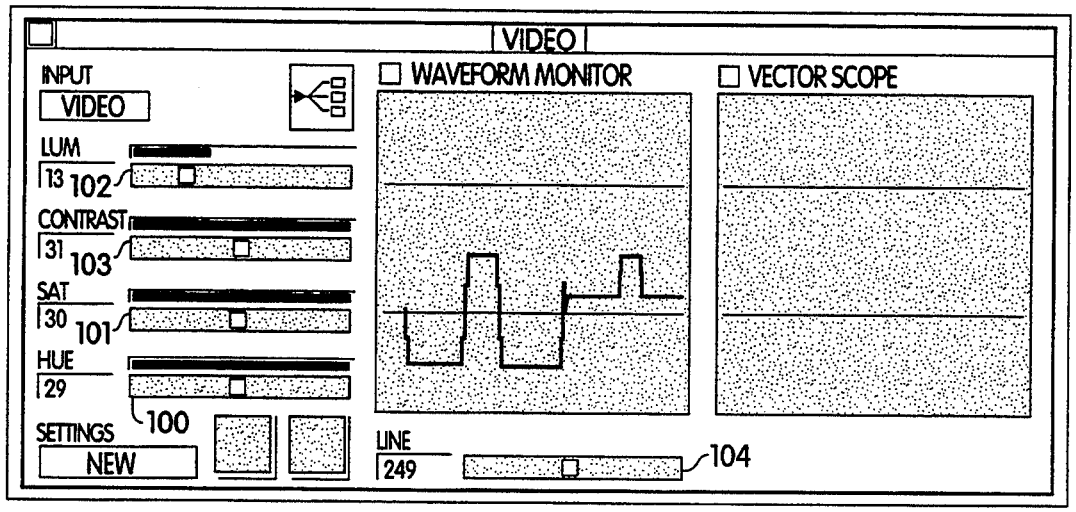
FIGS. 5a and 5b are schematic illustrations of image capture instrumentation.
Figure 5B:
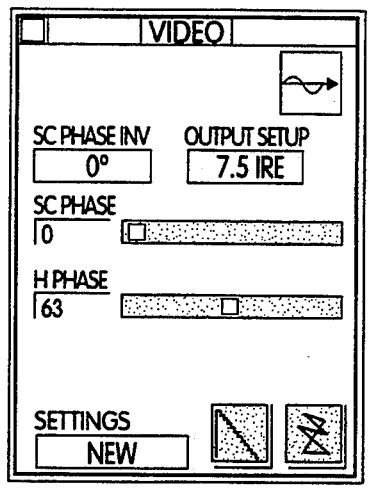

The improved media composer of the invention has been updated to provide image input and output instrumentation in the form of a waveform monitor, a vectorscope and black level controls as shown in FIGS. 5a and 5b. This improved Video Tool allows the operator to save and load settings for contrast, luminance, hue and saturation. Such settings control the video coprocessor 29 and adjust incoming data. The waveform generator and vectorscope are analogous to their analog counterparts which are well known in the art. An operator viewing the waveform generator and vectorscope may use the sliders 100, 101, 102 and 103 to respectively set values for hue, saturation, luminance and contrast. These values control the video processor, in a manner known in the arts which adjusts incoming data accordingly. The line of a frame may be selected for viewing using slider 104. The use of sliders as an interface to allow an operator to set values is well known in the art.

Figure 6:
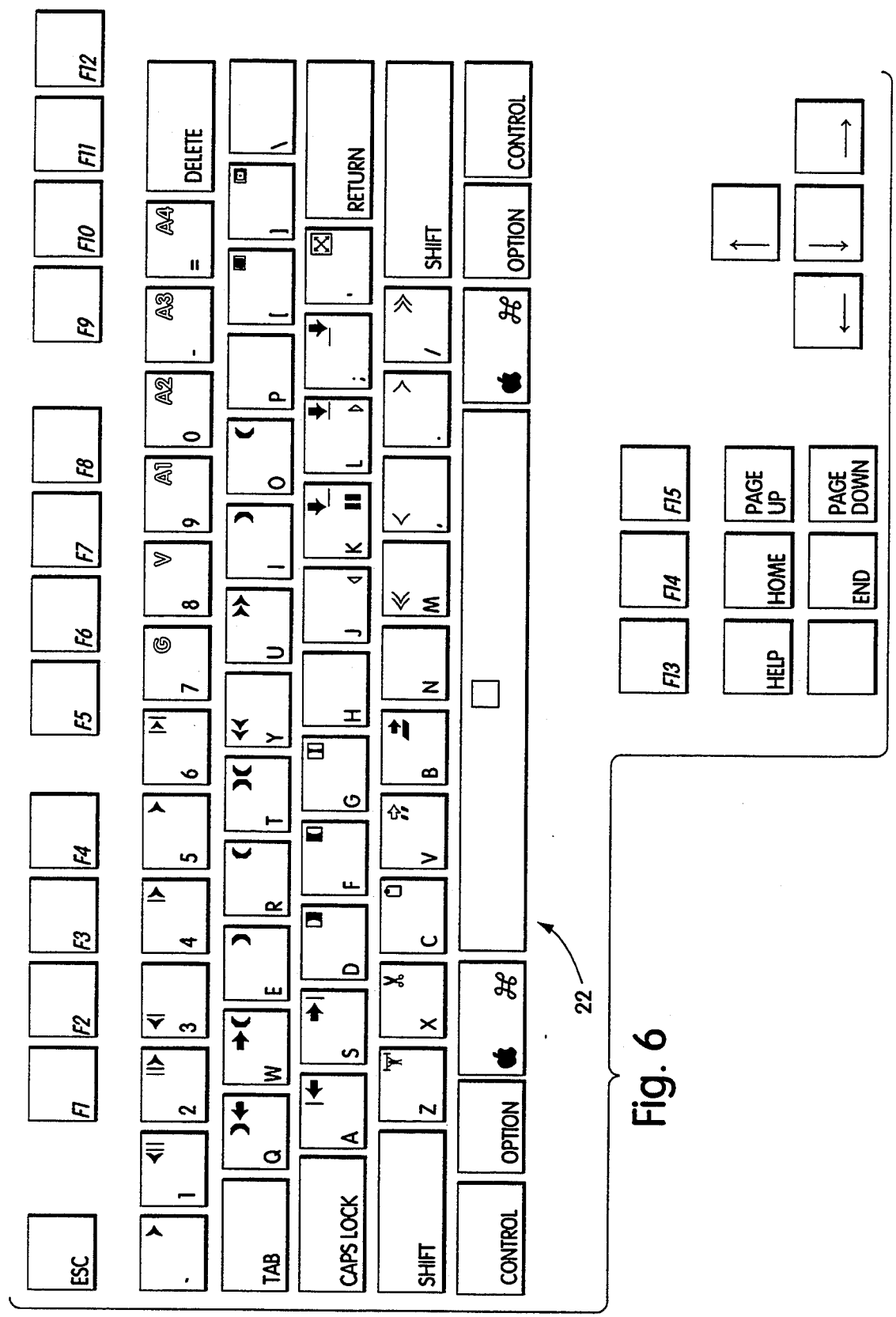
FIG. 6 is an illustration of a keyboard layout.
Figure 7:
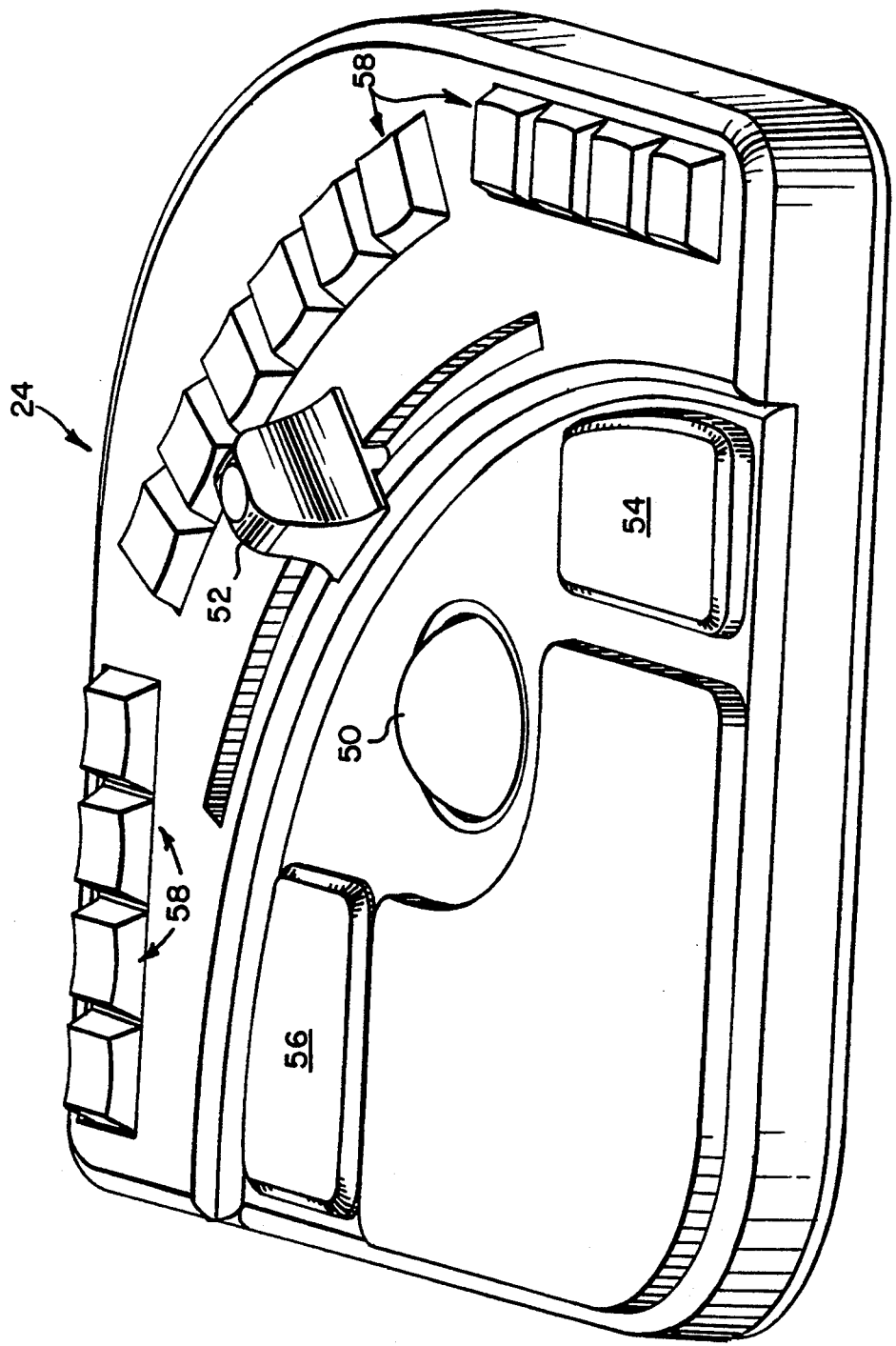
FIG. 7 is a perspective view of the mechanical user interface according to the invention.

Keyboard layout is shown in FIG. 6 and the function of the keys is set forth in Table 2. The keyboard 22 is augmented by the mechanical user interface 24. The mechanical user interface 24 is shown in more detail in FIG. 7. The interface 24 includes a track ball 50 and a speed controller 52. As with a mouse, the track ball 50 may be used to locate a cursor on the monitors. Buttons 54 and 56 serve functions like those provided by the click button on a mouse. It is preferred that the speed control 52 have detents for zero speed normal forward speed (30 frames per second) and a reverse normal speed. It is also preferred that the speed control 52 be spring loaded to return to the zero speed position. It is contemplated that additional buttons 58 be provided so that a user may program their functionality.

Yet another aspect of the improved media composer is sync point editing which allows the operator to specify a position in one monitor that is desired to be in sync with the position in the other monitor. The operator then performs an overwrite that preserves that sync relationship. Sync point editing (SPE) is accessed using the SPE command in the media composer menu. Sync point editing is performed in three steps. First, a point is specified in the destination, or record, clip, for example by placing a mouse cursor on the displayed frame of the clip and pressing the mouse button. The location within the clip is then stored. Second, a point in the source material is identified in a similar manner. Third, the size of the source information is specified, for example, by using IN and OUT markers. These steps may, in fact, be performed in any order, which may be defined by the programmer of the computer. After these three steps are completed, the source information is overwritten in the destination, or record, information, by placing the identified source location at the specified destination location. Such sync point editing may be performed with any combination of audio and video clips. Typically, it is performed to synchronize recorded sound to an event in a video clip. The operator may then turn PHANTOM marks on in the media composer window to see how the PHANTOM marks behave in relation to the position control in the record monitor 28. With SPE off, the system uses the current position as the IN; with SPE on, the current position is the sync point. It should be noted that one can mark the IN and OUT in the record monitor 28 instead of the source monitor 26.

TABLE 2

| Function | USB (y/n) | Keyboard Equivalent | Notes |
|---|---|---|---|
| 1-Frame Back | | 3 | motion control button |
| 1-Frame Forward | | 4 | motion control button |
| 10-Frame Back | | 1 | motion control button |
| 10-Frame Forward | | 2 | motion control button |
| A1 track on/off | | 9 | track selector |
| A2 track on/off | | 0 | track selector |
| A3 track on/off | | - | track selector |
| A4 track on/off | | = | track selector |
| activate source/record monitor | | ESCAPE | moved from * on numeric keypad |
| All Stop | | SPACE BAR | |
| Clear IN | Y | D | |
| Clear OUT | Y | F | |
| Clear Marks | Y | G | |
| Copy to Clipboard | Y | C | |
| Exit Mouse Shuttle | | SPACE BAR | |
| Extract | Y | X | |
| Fast Forward | | U | deck control function |
| Find Frame | Y | [ | |
| Full Screen on/off | | ' | mode toggle |
| Go to IN | Y | Q | |
| Go to OUT | Y | W | |
| Go to Prev Edit | Y | A | |
| Go to Next Edit | Y | S | |
| Graphics track on/off | | 7 | track selector |
| Lift | Y | Z | |
| Mark Clip | Y | T | |
| Mark IN | Y | E, I | two equivalents for convenience |
| Mark OUT | Y | R, O | two equivalents for convenience |
| Minus 10 Frames | | M | Trim Mode function-trim buttons |
| Minus 1 Frame | | < | Trim Mode function-trim buttons |
| Overwrite | Y | B | |
| Pause | | K | except in Trim Mode; mouse shuttle and deck control function |
| Play | Y | 5 | moved from Tab. The big Play button can be configured as Play IN to OUT or Shuttle Forward |
| Play IN to OUT | Y | 6 | see Play |
| Plus 1 Frame | | > | Trim Mode function-trim buttons |
| Plus 10 Frames | | / | Trim Mode function-trim buttons |
| Rewind | | Y | deck control function |
| Safe Title/Action | Y | ] | |
| Shuttle Back | | J | mouse shuttle and deck control function |
| Shuttle Forward | | L | except in Trim Mode; mouse shuttle and deck control function |
| Slip Left (1 frame) | Y | < | except in Trim Mode |
| Slip Left (10 frames) | | M | except in Trim Mode |
| Slip Right (1 frame) | Y | > | except in Trim Mode |
| Slip Right (10 frames) | | ? | except in Trim Mode |

TABLE 2-continued

| Function | USB (y/n) | Keyboard Equivalent | Notes |
|---|---|---|---|
| Splice | Y | V | |
| Trim Both | | L | only in Trim Mode |
| Trim Incoming | | ; | only in Trim Mode |
| Trim Outgoing | | K | only in Trim Mode |
| Video track on/off | | 8 | track selector |
| Delete Clip/Sequence (from a bin) | | DELETE | opens delete dialog box from Bin menu |

Another aspect of the invention is slip-sync editing. This kind of editing typically refers to maintaining synchronization between a series of video clips and corresponding audio clips when transitions between clips are trimmed. In prior art systems, when an audio clip was trimmed, i.e., made shorter, subsequent clips became out of synchronization with their corresponding video clips. In the present system, when audio material is removed from one end of an audio segment from a clip, source material from the original audio clip is added to the other end of the segment so as to maintain the length of the audio segment. The source material can readily be retrieved from the memory location or disk on which it is stored. Thus, the synchronization of subsequent clips is maintained.

Another aspect of the invention allows placement of graphics material interactively on a frame or frames of a video clip. Graphics material may be generated using standard, well-known graphics applications programs, and may be in standard formats, such as PICT format. A data file for graphics material may be accessed and displayed along with a frame from a video clip. Its position may be adjusted by placing, for example, a mouse cursor on the graphics. When an appropriate position has been determined by an operator, the graphics may be made a permanent part of the video clip.

Another aspect of the invention is known as media consolidate. Media consolidate allows a user to select a set of clips in sequences and then copy media data from the media files referred to by that set into new media files on a target disk. A user would typically use this feature when he/she is done or almost done with a project and wants to free up most of his disk space but wants to be able to do more work at some later date without having to redigitize. By consolidating his media to a single disk, the remaining disks can be used for the next project. Of course, if the target disk is removable, all the drives in the media composer can be freed up. It is noted that the source media must be on line for media consolidate to work since it is not going back to the original tapes.

What is claimed is:

1. Media composer for editing source material comprising:

digitizing apparatus for receiving, and digitizing video and audio source material;

storage to receive the video and audio source material;

computing apparatus including compression apparatus responsive to the digitizing apparatus, said compression apparatus being for compressing and storing the source material in the storage, wherein the computing apparatus is responsive to the storage to determine if the source material occupies more than a target amount of the storage and provide an indication if the source material does occupy more than the target amount of the storage, wherein the compression apparatus is responsive to the indication to adjust its compression if the source material does occupy more than the target amount of the storage, the computing apparatus further being for manipulating the stored source material;

output apparatus communicating with the computing apparatus for displaying the manipulated source material and control information;

wherein the computing apparatus is programmed so that multiple resolutions can be displayed, recorded and played back.

2. The media composer of claim 1 wherein the compression apparatus is a JPEG compression apparatus and includes dynamic adjustment of tables in a JPEG chip to improve compression roll off.

3. The media composer of claim 1 further including a video coprocessor and including a 128-bit wide data path between the JPEG compression apparatus and the video coprocessor.

4. The media composer of claim 1 wherein the computing apparatus is programmed to provide motion effects in the display material and is further programmed to provide a dial whose rotation rate corresponds with a selected motion effect rate.

5. The media composer of claim 1 wherein the compression apparatus is a JPEG compression apparatus and wherein the clock speed in the JPEG compression apparatus runs at 70 MHz.

6. The media composer of claim 1 wherein the source material is digitized to a 24-bit word for each pixel.

7. The media composer of claim 1 further including a mechanical user interface including a track ball and a speed controller.

8. The media composer of claim 1 wherein the computing apparatus is programmed to generate smooth continuous audio having a pitch corresponding to the speed of video material being displayed.

9. The media composer of claim 1 wherein the computing apparatus is further programmed to consolidate media to a single disk in the system.

10. The media composer of claim 1 wherein the display apparatus includes a source monitor and a record monitor and wherein the computing apparatus is programmed so that a video sequence in the source monitor may be overwritten onto a sequence in the record monitor wherein synchronism is maintained between a selected frame in the source monitor sequence and a selected frame in the record monitor.

11. The media composer of claim 1 further including a mouse controller connected with a keyboard, the mouse controller adapted to function as a shuttle control.

12. The media composer of claim 1 further adapted to import a graphic for editing onto a video track wherein the position of the graphic may be controlled and its position displayed in the display apparatus relative to its original position or to its position immediately before the graphic has been moved.

13. A media composer of claim 1 wherein the computing apparatus is programmed to display video wave forms, a vectorscope and black level controls.

14. The media composer of claim 1 wherein the computing apparatus is responsive to the compression apparatus to receive an interrupt from the compression apparatus before the compression apparatus has finished compressing the source material.

15. The media composer of claim 14 wherein the compression apparatus is adapted to send blank video information to the computing apparatus after generating an interrupt.

16. The media composer of claim 15 wherein the blank video information comprises 8 blank lines.

17. The media composer of claim 1 wherein the compression apparatus is a JPEG compression apparatus, and wherein the compression apparatus is constructed to increase a JPEG queue factor in response to the indication.

18. The media composer of claim 1 wherein the compression apparatus is a JPEG compression apparatus and wherein the compression apparatus is instructed to adjust compression table values in response to the indication.

19. The media composer of claim 1 wherein the computing apparatus is constructed to provide a disparity value to the compression apparatus.

20. The media composer of claim 19 wherein the compression apparatus is a JPEG compression apparatus and wherein the compression processor is responsive to the disparity value to determine a number of frequencies to be decreased in JPEG processing.

* * * * *